(12) United States Patent  
Zhang et al.

(10) Patent No.: US 8,451,892 B2  
(45) Date of Patent: May 28, 2013

(54) METHOD AND SYSTEM FOR LINEAR QUANTIZATION AND DEQUANTIZATION

(75) Inventors: Yan Ryan Zhang, Beijing (CN);  
Clifford Reader, Saratoga, CA (US);  
Peter Farkas, Santa Cruz, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1002 days.

(21) Appl. No.: 12/495,092

(22) Filed: Jun. 30, 2009  
(Under 37 CFR 1.47)

(65) Prior Publication Data  
US 2010/0329332 A1 Dec. 30, 2010

(51) Int. Cl.  
*H04N 7/18* (2006.01)

(52) U.S. Cl.  
USPC ............. 375/240.04; 375/240.05; 375/240.06

(58) Field of Classification Search  
USPC ........................ 375/240.01–240.29  
See application file for complete search history.

(56) References Cited

U.S. PATENT DOCUMENTS 7,170,942 B2 * 1/2007 Kerofsky ................. 375/240.25

* cited by examiner

*Primary Examiner* — Andy Rao  
(74) *Attorney, Agent, or Firm* — Osha Liang LLP (57) ABSTRACT

A method including receiving a set of input data in a first matrix format. The method further includes compressing the set of input data to obtain a first set of compressed data in a second matrix format, where compressing the set of input data includes using a quantization equation, the quantization equation including $Yq(i,j)=[(Y(i,j)+offset)<<n]/qs$, where $Yq(i,j)$ represents a coefficient in a matrix of the first set of compressed data having a coordinate $(i,j)$, $Y(i,j)$ represents a coefficient in a matrix of the set of input data having the coordinate $(i,j)$, offset is an integer, $<<$ is a first bit-wise shift operator, n is an integer, qs is a real number. The method also includes sending the first set of compressed data to a first destination.

20 Claims, 7 Drawing Sheets

METHOD AND SYSTEM FOR LINEAR QUANTIZATION AND DEQUANTIZATION

BACKGROUND

Media, such as video media, is transmitted, both in fixed quantities of data and in streams of data. Because of the size of the data being transmitted, different methods are used to efficiently transmit the data. One method is compressing the data at its source, transmitting the compressed data, and decompressing the compressed data at the receiving end. Data compression is beneficial because it requires less bandwidth, which reduces the cost of transmitting the data and makes the transmission of the data more efficient. On the other hand, compression runs a risk of reducing the quality of the data once it is decompressed. When data is compressed, some of the data may be lost and may not be recovered during decompression.

Within the field of data compression and decompression, different methods exist. One method uses discrete cosine transformation of the source data, followed by a form of linear quantization to compress the data. Once the compressed data is received, it goes through a linear dequantization, followed by an inverse discrete cosine transformation, to become decompressed. Different methods for linear quantization and linear dequantization exist, and each must balance the dilemma between the bandwidth consumed by the compressed data and the quality of the decompressed data at the receiving end.

SUMMARY

One or more embodiments of the present invention relate to a computer readable medium including instructions executable by a processor to perform a method, the method including receiving a set of input data in a first matrix format. The method further includes compressing the set of input data to obtain a first set of compressed data in a second matrix format, where compressing the set of input data includes using a quantization equation, the quantization equation including $Yq(i,j)=[(Y(i,j)+\text{offset})<<n]/qs$, where $Yq(i,j)$ represents a coefficient in a matrix of the first set of compressed data having a coordinate $(i,j)$, $Y(i,j)$ represents a coefficient in a matrix of the set of input data having the coordinate $(i,j)$, offset is an integer, $<<$ is a first bit-wise shift operator, n is an integer, qs is a real number. The method also includes sending the first set of compressed data to a first destination.

One or more embodiments of the present invention relate to a data compression module including a processor. The data compression module also includes a memory including software instructions which, when executed by the processor, enable the data compression module to compress input data in a first matrix format to obtain compressed data in a second matrix format, where compressing the input data includes using a quantization equation, the quantization equation including $Yq(i,j)=[(Y(i,j)+\text{offset})<<n]/qs$, where $Yq(i,j)$ represents a coefficient in a matrix of the first set of compressed data having a coordinate $(i,j)$, $Y(i,j)$ represents a coefficient in a matrix of the set of input data having the coordinate $(i,j)$, offset is an integer, $<<$ is a first bit-wise shift operator, n is an integer, qs is a real number. The data compression module further includes a data interface configured to receive the input data in the first matrix format from a video source and send the compressed data in the second matrix format to a destination.

One or more embodiments of the present invention relate to a data decompression module including a processor. The data decompression module further includes a memory comprising software instructions which, when executed by the processor, enable the data decompression module to decompress compressed data in a first matrix format to obtain decompressed data in a second matrix format, where decompressing the compressed data comprises using a dequantization equation, the dequantization equation including $Ydq(i,j)=(Yq(i,j)\times qs)>>n$, where $Ydq(i,j)$ represents a coefficient in a matrix of the decompressed data having a coordinate $(i,j)$, $Yq(i,j)$ represents a coefficient in a matrix of the compressed data having a coordinate $(i,j)$, qs is a real number, n is an integer, and $>>$ is a second bit-wise shift operator. The data decompression module also includes a data interface configured to receive the compressed data in the first matrix format from a network and send the decompressed data in the second matrix format to a destination.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for the transmission of data using linear quantization and dequantization. More specifically, one or more embodiments of the invention provide a method and system for applying linear quantization to data to compress the data before transmitting the data. Further, one or more embodiments of the invention provide a method and system for applying linear dequantization to compressed data to decompress the compressed data.

Figure 1:
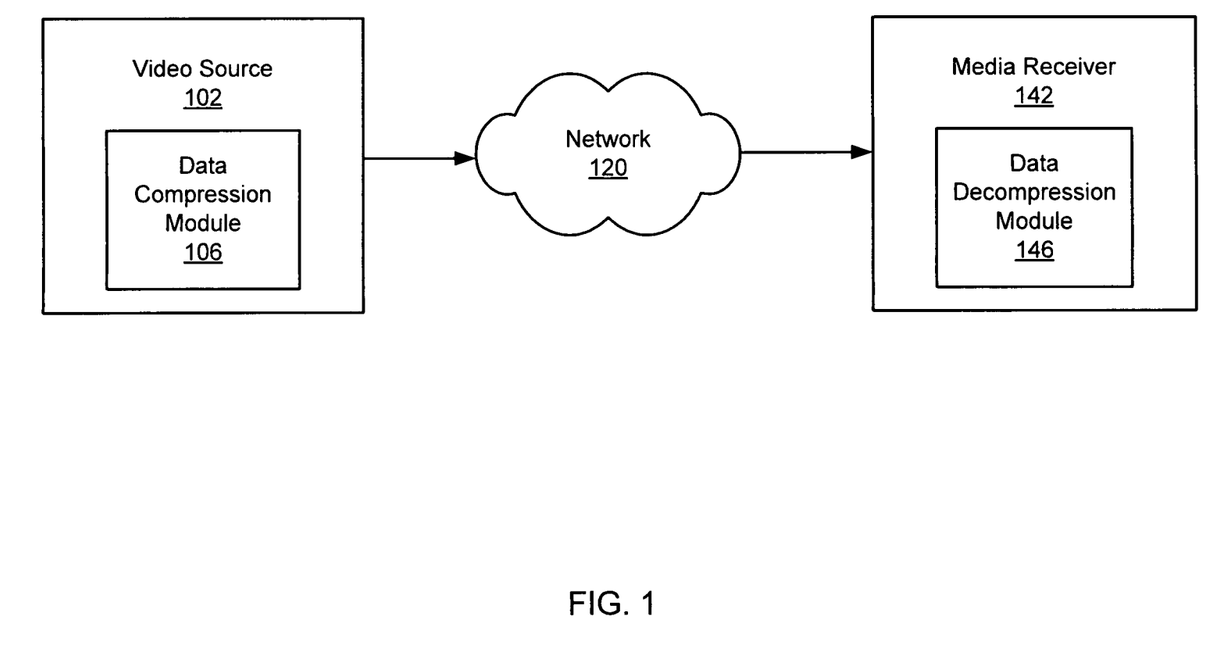
FIGS. 1-2 show schematic diagrams of a system in accordance with one or more embodiments of the invention.

FIG. 1 shows a diagram of a system in accordance with one or more embodiments of the invention. The system includes a video source (102), a network (120), and a media receiver (142). The video source (102) includes a data compression module (106). The media receiver (142) includes a data decompression module (146). Each of these components is described below. One of ordinary skill in the art will appreciate that embodiments of the invention are not limited to the configuration shown in FIG. 1.

In one or more embodiments of the invention, the video source (102) is configured to communicate with the media receiver (142) using the network (120). The video source (102) may be any source of data, where the data may include but is not limited to video, audio, transport, control, content security, some other source of data, or any combination thereof. Examples of a video source (102) include, but are not limited to, a television station, a video camera, a video recorder, and a multi-media repository storing multi-media files. Examples of a network (120) include, but are not limited to, a local area network (LAN), a wide area network (WAN) such as the Internet, satellite, or any other similar type of network. The network (120) may also be a type of tangible computer readable medium such as a digital video disk (DVD), a compact disc (CD), a diskette, a tape, a memory stick such as a jump drive or a flash memory drive, or any other computer or machine readable storage medium. In one or more embodiments of the invention, the network (120) is accessed via a connection port on the video source (102), into which the media receiver (142) connects to communicate with the video source (102).

In one or more embodiments of the invention, the video source (102) is configured to host the data compression module (106). Alternatively, the data compression module (106) may be operatively connected as a device external to the video source (102). The compression module (106) is configured to compress the data before the data is transmitted to the media receiver (142) through the network (120).

In one or more embodiments of the invention, the media receiver (142) is configured to communicate with the network (120). The media receiver (142) may be any device capable of receiving the data from the data source (102). Examples of a media receiver (142) include, but are not limited to, a television set, a DVD player, a satellite receiver, and a computer. In one embodiment of the invention, the media receiver (142) is also configured to host the data decompression module (146). Alternatively, the data decompression module (146) may be operatively connected as a device external to the media receiver (142). The decompression module (146) is configured to decompress the compressed data after receiving the compressed data transmitted by the video source (102) through the network (120). Those skilled in the art will appreciate that a single computer system may include both a video source and a media receiver.

Figure 2:
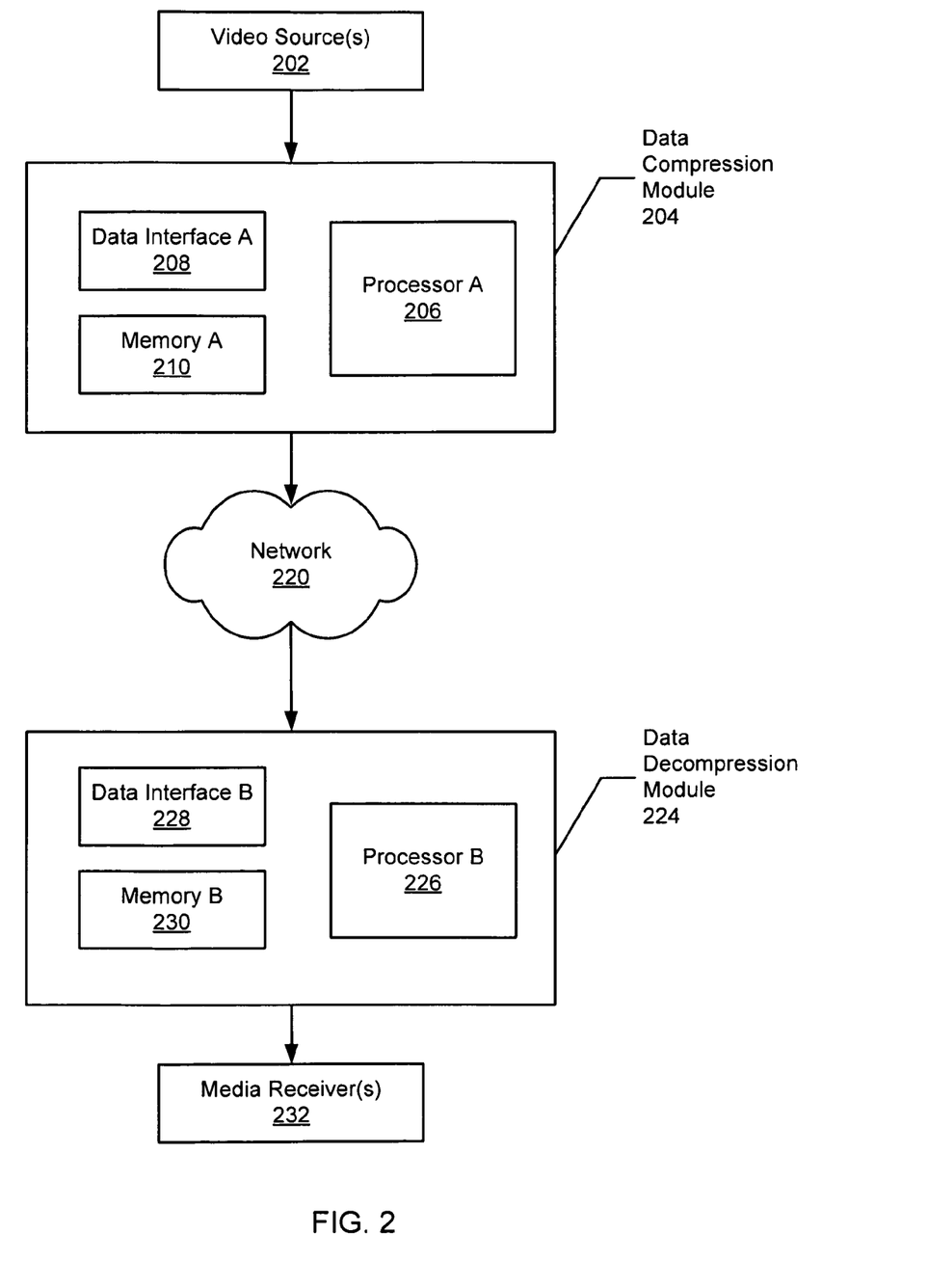

FIG. 2 shows a diagram of a system in accordance with one or more embodiments of the invention. The system includes a video source(s) (202), a data compression module (204), a network (220), a data decompression module (224), and a media receiver(s) (232). The data compression module (204) includes a data interface A (208), a memory A (210), and a processor A (206). The data decompression module (224) includes a data interface B (228), a memory B (230), and a processor B (226). Each of these components is described below. One of ordinary skill in the art will appreciate that embodiments of the invention are not limited to the configuration shown in FIG. 2.

The configuration and description for the video source(s) (202), network (220), and media receiver(s) (232) are substantially similar to the description for the corresponding components described with respect FIG. 1 above, with the exception that for purposes of the system in FIG. 2, the data compression module (204) is operatively connected to the video source(s) (202) as an external device and the data decompression module (224) is operatively connected to the media receiver(s) (232) as an external device.

In one or more embodiments of the invention, the data compression module (204) includes data interface A (208), memory A (210), and processor A (206). Data interface A (208) is configured to receive data from the video source(s) (202) and send data to the data decompression module (224) through the network (220).

In one or more embodiments of the invention, processor A (206) is configured to execute software instructions configured to perform various functionalities of one or more embodiments of the invention discussed below.

In one or more embodiments of the invention, memory A (210) is configured to store software instructions as well as data received from the video source(s) (202). Memory A (210) may be flash memory, a hard disk drive (HDD), random access memory (RAM), read-only memory (ROM), any other type of suitable storage space, or any combination thereof. In addition, memory A (210) stores software instructions configured to perform embodiments of the invention. Alternatively, the aforementioned software instructions may be stored on any tangible computer readable medium such as a compact disc (CD), a diskette, a tape, a memory stick such as a jump drive or a flash memory drive, or any other computer or machine readable storage device that can be read and executed by the processor A (206) of the data compression module (204).

In one or more embodiments of the invention, the data decompression module (224) includes data interface B (228), memory B (230), and processor B (226). Data interface B (228) is configured to receive data from the data compression module (204) through the network (220) and send data to the media receiver(s) (232).

In one or more embodiments of the invention, processor B (226) is configured to execute software instructions configured to perform various functionalities of one or more embodiments of the invention discussed below.

In one or more embodiments of the invention, memory B (230) is configured to store software instructions as well as data to be sent to the media receiver(s) (232). Memory B (230) may be flash memory, a hard disk drive (HDD), random access memory (RAM), read-only memory (ROM), any other type of suitable storage space, or any combination thereof. In addition, memory B (230) stores the aforementioned software instructions. Alternatively, software instructions to perform embodiments of the invention may be stored on any tangible computer readable medium such as a compact disc (CD), a diskette, a tape, a memory stick such as a jump drive or a flash memory drive, or any other computer or machine readable storage device that can be read and executed by processor B (226) of the data decompression module (224).

Those skilled in the art will appreciate that while the FIGS. 1-2 include a network as the medium over which the compressed data is sent, the compressed data may be stored on a tangible medium such as a DVD, flash drive, or any other medium capable of storing compressed data and be physically transported to a location that includes an appropriate media receiver for obtaining the compressed data from the medium and decompressing the data.

Figure 3A:
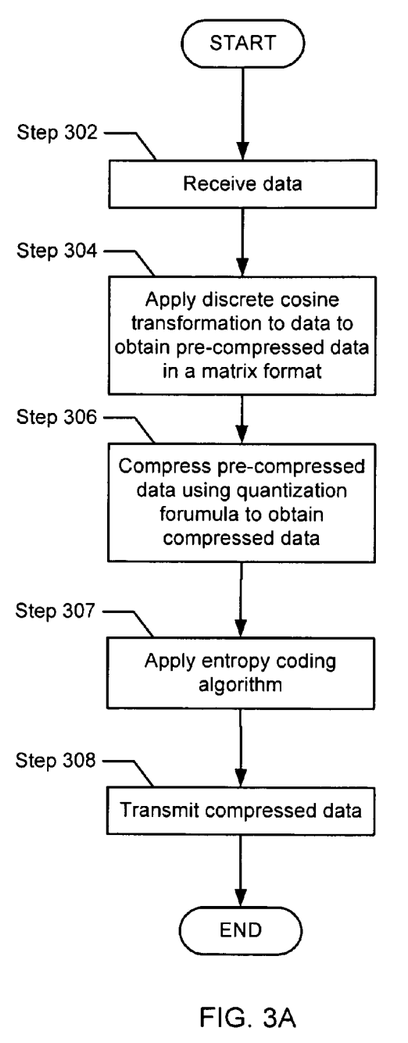
FIGS. 3-4 show flowcharts of methods in accordance with one or more embodiments of the invention.
Figure 3B:
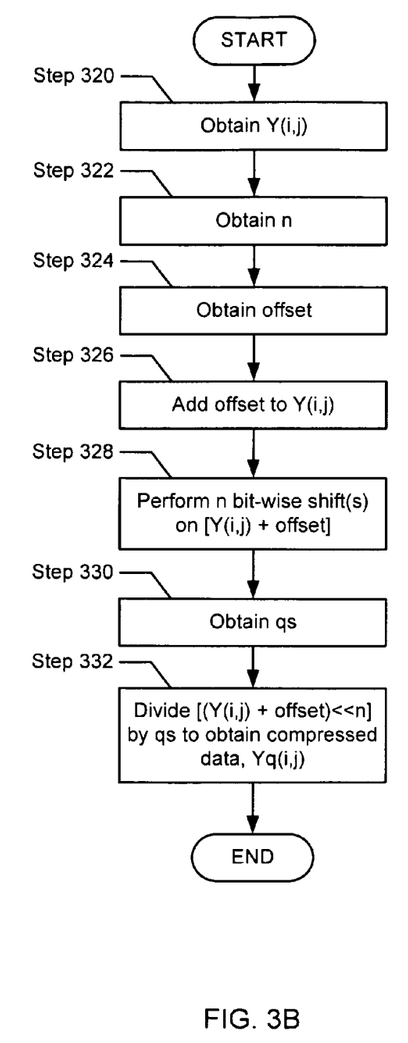

FIGS. 3A-3B show flowcharts of a method for compressing data in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, a person of ordinary skill in the art will appreciate that additional steps, omitted in FIGS. 3A-3B, may be included in performing this method for compressing data. Accordingly, the specific arrangement of steps shown in FIGS. 3A-3B should not be construed as limiting the scope of the invention.

Referring to FIG. 3A, in Step 302, data is received. The data may be a finite set of data. Alternatively, the data may be a stream of data. The data may be any type of data, including but not limited to video, audio, transport, control, content security, some other type of data, or any combination thereof. At least some of the data may be negative (i.e., have a value less than zero). In Step 304, a discrete cosine transformation (DCT) is applied to the data to obtain pre-compressed data. The pre-compressed data is laid out in a matrix format. That is, the data is expressed in a matrix with matrix coefficients organized in a rectangular array of columns and rows. The DCT may be one of a number of variations of DCT. In one or more embodiments of the invention, the variation of DCT is a type-II DCT. In Step 306, the pre-compressed data is compressed using a quantization formula to obtain compressed data. In Step 307, an entropy encoding algorithm is applied to the compressed data. In one embodiment of the invention, the entropy encoding algorithm is a lossless data compression scheme that is performed independent of the specific characteristics of the medium in which the data is contained. The entropy encoding algorithm may be one of a number of varieties, including but not limited to, Huffman, Adaptive Huffman, Universal, Golomb, Exp-Golomb, and Arithmetic. Further, the entropy encoding algorithm may comply with one of a number of image standards, including but not limited to, Joint Photographic Experts Group (JPEG), context-based adaptive binary arithmetic coding (CABAC), context-based adaptive variable length coding (CAVLC), two-dimensional variable length coding (2-D VLC), and Moving Picture Experts Group (MPEG-2). In Step 308, the compressed data is transmitted.

FIG. 3B shows a method for compressing the data using a quantization operation consistent with one or more embodiments of the invention. That is, FIG. 3B is an expansion of the steps involved in performing Step 306 in FIG. 3A. The purpose of the quantization operation is to compress a range of values within the data to a single quantum value. Quantization may be a lossy compression technique. A lossy compression technique is one in which the original data (i.e., start or input data), which is compressed, is different from the data that results when the compressed data is decompressed (i.e., end or output data), but the start data and end data are similar enough to be useful in some way. In other words, the lossy compression technique is used to strike a balance between precision loss and quality when comparing the output data with the input data after a quantization/dequantization sequence.

FIG. 3B shows a method for quantizing the compressed data using a quantization formula using a floating point operation. Floating point describes a scenario where a rational number is represented by a string of digits or bits, and the binary point (the binary equivalent of a decimal point) may shift anywhere along the string of bits. In one or more embodiments of the invention, floating point operations may be in a single float format or a double float format. Numbers in floating point format require more storage than numbers in integer format. Those skilled in the art will appreciate that computers either cannot perform a floating point operation or are not as efficient at performing the floating point operation when compared to an integer operation. In addition, floating point format represents a wider range of numbers, but may be less precise than integer format. Turning to method in FIG. 3B, for the sake of clarity, the quantization formula described in FIG. 3B may be expressed as:

$$Yq(i,j)=[(Y(i,j)+\text{offset})<<n]/qs \qquad (1)$$

In equation (1), Yq(i,j) represents a coefficient in a matrix of the quantized, compressed data. In one or more embodiments of the invention, Yq(i,j) may be a real number. Alternatively, Yq(i,j) may be an integer where the value of Yq(i,j) is rounded to arrive at an integer value. Alternatively, Yq(i,j) may be truncated to arrive at an integer value. The other variables in equation (1) are described below in the method for calculating Yq(i,j).

In Step 320, data represented by Y(i,j) is obtained from the matrix. In one or more embodiments of the invention, Y(i,j) represents a coefficient in a matrix of the data after a discrete cosine transformation has been applied to the data, as described above in Step 304 of FIG. 3A. Y(i,j) may have a negative value, a positive value, or a null value. The absolute value of Y(i,j) (depicted as, e.g., abs[Y(i,j)] or |Y(i,j)|) may be calculated and used in place of Y(i,j) in the remaining Steps in this FIG. 3B, regardless of whether Y(i,j) has a positive, negative, or null value. In one or more embodiments of the invention, Y(i,j) is a real number. Alternatively, Y(i,j) may be an integer where the value of Y(i,j) is rounded to arrive at an integer value. Alternatively, Y(i,j) may be truncated to arrive at an integer value. In Step 322, n is obtained. In one or more embodiments of the invention, n is an integer that determines, at least in part, the magnitude of a bitwise shift operator, which is described in Steps 324 and 328 below. Generally, bitwise shift operators move bit values of a binary object. The bit values are shifted in the direction of the opening of the operands (i.e., ">>" shifts bits to the right, and "<<" shifts bits to the left). The bit pattern (i.e., the value to be shifted) is given by the left operand, and the right operand corresponds to the number of positions to shift the bits in the value. A user may determine the value of n. The value of n may also be a default value. In one or more embodiments of the invention, the value of n is 10.

In Step 324, an offset is obtained. In one or more embodiments of the invention, the offset is an adjustment used to reduce the precision loss of data (i.e., retain more precision of the data) that may result from the discrete cosine transformation, as described in Step 304 in FIG. 3A, and when compressing the data. The offset may be determined by equation (2):

$$\text{Offset}=1+(\text{quantOffset}[OMSQP\%m])>>(n\text{-}OMSQP) \qquad (2)$$

In this equation (2), quantOffset is an array of a quantization operation, m is an integer, OMSQP is an integer, OMSQP%m is an integer, and ">>" is a bit-wise shift operator. More specifically, m is the number of members within the quantOffset array, OMSQP is a configuration parameter, and OMSQP%m is a remainder of a quotient of OMSQP and m. The bit-wise shift operator >> may shift data to the right by a number of bits determined by (n-OMSQP), where n is described in Step 322 above. The data shifted by the bit-wise shift operator may be the offset. In one or more embodiments of the invention, quantOffset[OMSQP%m] is divided by 2 to the power of (n-OMSQP). The quantOffset array may be determined using statistical modeling. In one or more embodiments of the invention, m is 7, and the elements of the quantOffset array are 250, 281, 312, 343, 406, 437, and 468. A user may set the value of OMSQP. In one or more embodiments of the invention, OMSQP is a number between 1 and 56. In one or more embodiments of the invention, OMSQP is greater than 9. In one or more embodiments of the invention, OMSQP is set to 28 or 29.

In Step 326, the offset from Step 324 is added to Y(i,j) from Step 320. In Step 328, a bit-wise shift is performed on the value achieved in Step 326 (i.e., Y(i,j)+offset). The bit-wise shift operator << may shift data to the left by a number of bits determined by n (described in Step 322). In one or more embodiments of the invention, (Y(i,j)+offset) is multiplied by 2 to the power of n. In Step 330, qs is obtained. In one or more embodiments of the invention, qs is a configuration parameter in the form of a real number. In one or more embodiments of the invention, qs may represent a quantization strategy. A quantization strategy may account for precision loss control, performance control (e.g., use of integer operations or floating point operations), smooth video quality classification, some other aspect of performance, or any combination thereof. As the value of qs becomes smaller, the coefficient of the compressed data and associated offset (i.e., Y(i,j)+offset) becomes more granular when quantized. The value of qs may be chosen by a user. Alternatively, the value of qs may be a default setting. In Step 332, the value obtained in Step 328 (i.e., [(Y(i,j)+offset)<<n]) is divided by qs. If Y(i,j) from Step 320 above has a negative value, then Yq(i,j) is given a negative value. In one or more embodiments of the invention, the data is compressed upon the completion of Step 332.

An integer format (e.g., non-floating point format) of the quantization formula described in FIG. 3B may be represented by equation (3):

$$Yq(i,j)=[(abs(Y(i,j))+offset) \times 2^n]/(qs \times 2^n) \quad (3)$$

where abs(Y(i,j)) is the absolute value of Y(i,j), and the variables in equation (3) (i.e., Yq(i,j), Y(i,j), offset, n, and qs) each have the same characteristics as described in the corresponding portions of FIG. 3B. In addition, qs may be represented by q_matrix. In one or more embodiments of the invention, q_matrix is an array of real numbers. The array represented by q_matrix may be {1, 1.125, 1.25, 1.375, 1.625, 1.75, 1.875}. The denominator of equation (3) (i.e., qs×2$^n$) may be represented by q_matrix_int. In one or more embodiments of the invention, q_matrix_int is an array of finite integers. The number of members in the array represented by q_matrix_int may be equal to the number of member in the array represented by q_matrix, as described above. The array represented by q_matrix_int may be {1024, 1152, 1280, 1408, 1664, 1792, 1920}.

Figure 4A:
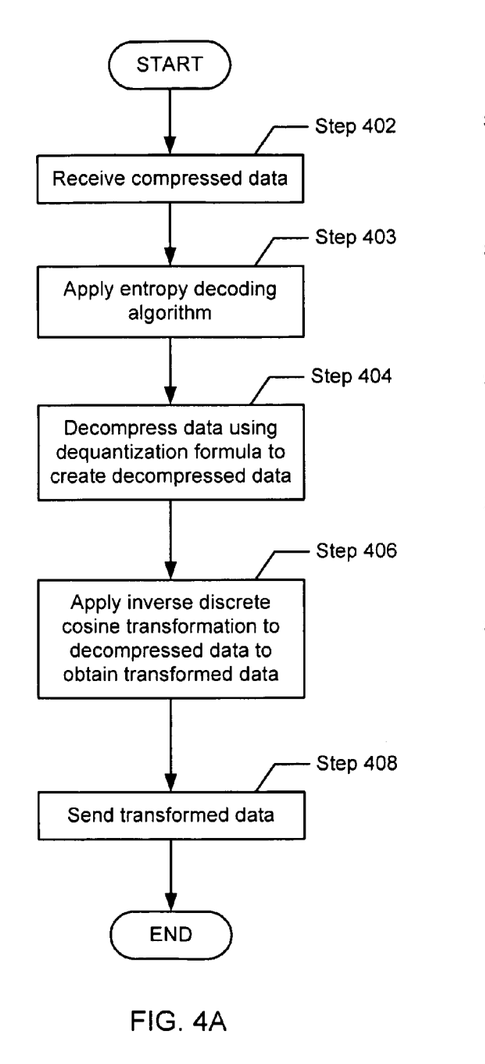
Figure 4B:
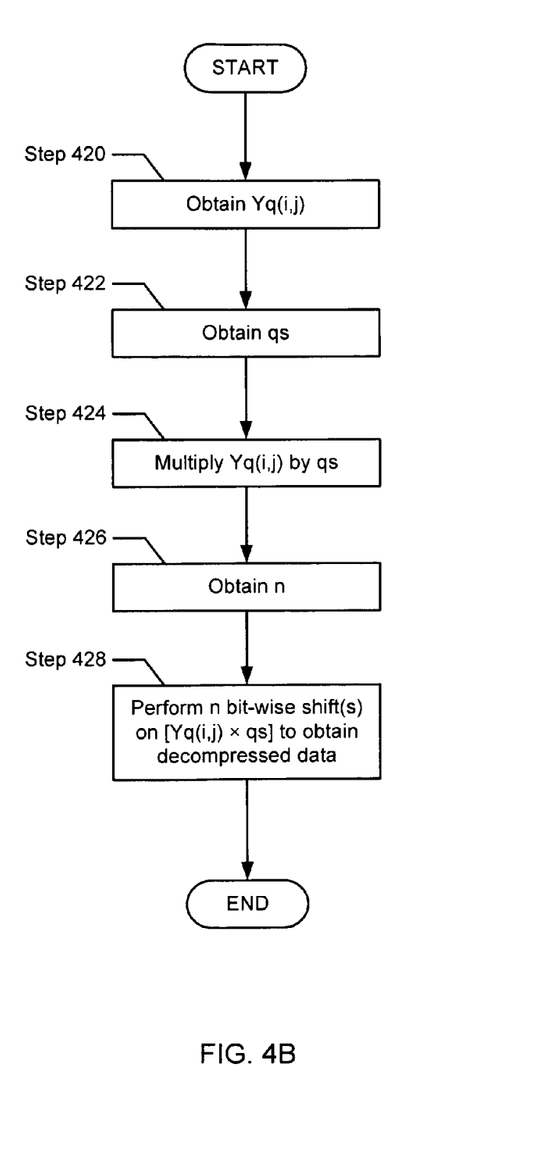

FIGS. 4A-4B show flowcharts of a method for decompressing compressed data in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, a person of ordinary skill in the art will appreciate that other steps, omitted in FIGS. 4A-4B, may be included in this flowchart. Accordingly, the specific arrangement of steps shown in FIGS. 4A-4B should not be construed as limiting the scope of the invention.

Referring to FIG. 4A, in Step 402, compressed data is received. In one or more embodiments of the invention, the compressed data is created from the method described in FIGS. 3A-3B. In Step 403, the compressed data may be processed by a decoder. In one or more embodiments of the invention, an entropy decoding algorithm is applied to the compressed data. An entropy decoding algorithm is a lossless data decompression scheme that is performed independent of the specific characteristics of the medium in which the data is contained. The entropy decoding algorithm in this Step 403 may be of the same variety and/or comply with the same standards as the entropy encoding algorithm used in Step 307. In Step 404, the compressed data is decompressed using a dequantization formula. FIG. 4B shows a method for decompressing the compressed data using a dequantization formula in accordance with one or more embodiments of the invention. The purpose of the dequantization operation is to decompress (i.e., restore) a single quantum value to a range of values, where the values correspond to the original data (or substantially similar data) (i.e., the data before is was compressed)

Referring to FIG. 4B, in Step 420, Yq(i,j) is obtained. In one or more embodiments of the invention, Yq(i,j) represents a coefficient in a matrix of the compressed data. The value of Yq(i,j) may be identical to the calculated value of Yq(i,j) described in Step 332 of FIG. 3B. In Step 422, qs is obtained. In one or more embodiments of the invention, qs is a configuration parameter in the form of a real number. In one or more embodiments of the invention, qs may represent a quantization strategy. As the value of qs becomes smaller, the coefficient of the quantized, compressed data (i.e., Yq(i,j)) becomes more granular when dequantized. The value of qs may be derived from parsing the compressed data. The value of qs may be identical to the value of qs described in Step 330 in FIG. 3B above. In Step 424, Yq(i,j) is multiplied by qs. In Step 426, n is obtained. In one or more embodiments of the invention, n is an integer that determines the magnitude of a bit-wise shift operator, as described in Step 428 below. A user may determine the value of n. The value of n may also be a default value. In one or more embodiments of the invention, n is 10. The value of n may be identical to the value of n described in Step 322 in FIG. 3B above. In Step 428, a bit-wise shift is performed on the value obtained in Step 424 (i.e., [Yq(i,j)×qs]). In one or more embodiments of the invention, the bit-wise shift is performed n times, where n is described in Step 426 above. The bit-wise shift operator >> may shift data to the right by a number of bits determined by n. In one or more embodiments of the invention, [Yq(i,j)×qs] is divided by 2 to the power of n. For the sake of clarity, the dequantization formula described in FIG. 4B may be depicted as:

$$Ydq(i,j)=[Yq(i,j) \times qs] >> n \quad (4)$$

In equation (4), in one or more embodiments of the invention, Ydq(i,j) represents a coefficient in a matrix of the decompressed data. In one or more embodiments of the invention, Ydq(i,j) may be a real number. Alternatively, Ydq(i,j) may be an integer where the value of Ydq(i,j) is rounded to arrive at an integer value. Alternatively, Ydq(i,j) may be truncated to arrive at an integer value.

Returning to FIG. 4A, in Step 406, an inverse discrete cosine transformation (IDCT) is applied to the decompressed data (i.e., the data resulting from Step 428). The IDCT may be one of a number of variations of IDCT. The variation of IDCT may be the inverse of the variation of DCT described in Step 304 of FIG. 3A. In one or more embodiments of the invention, the variation of IDCT is a type-III DCT. In Step 408, the decompressed data is sent to media receiver for display and/or storage.

In one or more embodiments of the invention, the quantization and dequantization process described in FIGS. 3A-4B above may be implemented in a media stack within an operating system of a computer or another device capable of generating and sending compressed data or receiving and decompressing data. For example, the quantization and dequantization process described above may be used in a Media Stack (MS) executing on one or more of the components shown in FIGS. 1 and 2. One example of the media stack is the Open Media Stack (OMS), which is a video specification standard that defines a video decoder and the associated bitstream syntax. OMS is intended for delivery, storage and playback of video streams.

The following describes some examples in accordance with one or more embodiments of the invention. The examples are for explanatory purposes only and is not intended to limit the scope of the invention. Terminology used in FIGS. 1-2 may be used in the examples without further reference to FIGS. 1-2.

EXAMPLE 1

The following scenario describes a method to quantize and dequantize data in accordance with one or more embodiments described above. To perform quantization, assuming $Y(i,j)=11$, $qs=1.125$, and offset=1, the quantization formula is modified to: $Yq(i,j)=[Y(i,j)+offset]/qs=(11+1)/1.125=12/1.125=10.67$, which is truncated to 10. To perform dequantization, $Ydq(i,j)=Yq(i,j)\times qs=10\times 1.125=11.25$, which is truncated to 11. In this example, there is no appreciable precision loss, as shown by the value of the input data being equal to the value of the output data.

EXAMPLE 2

Consider a scenario similar to Example 1, but where the quantization formula is modified to work with negative values of $Y(i,j)$ during quantization and dequantization in order to decrease the precision loss between the input data and the output data. To perform quantization, assuming $Y(i,j)=-11$, $qs=1.125$, and offset=1, the quantization formula is modified to: $Yq(i,j)=\text{sign}\{[\text{abs}(Y(i,j))+\text{offset}]/qs\}=\text{sign}\{(11+1)/1.125\}=\text{sign}\{12/1.125\}=\text{sign}\{10.67\}, -10.67$, which is truncated to $-10$. To perform dequantization, $Ydq(i,j)=Yq(i,j)\times qs=-10\times 1.125=-11.25$, which is truncated to $-11$, Here, "sign" is an operator that restores the original sign (i.e., plus or minus) of the input data to the compressed number after dequantization. Also, "abs" is the absolute value of the input data.

EXAMPLE 3

Consider a scenario where floating point format is not available, or where floating point format is prohibitively computationally expensive or burdensome on a central processing unit. In such a scenario, the quantization formula may be modified to: $\text{abs}[Yq(i,j)]=[\text{abs}(Y(i,j))+\text{offset}]/qs$. By multiplying both numerator and denominator of the right-hand side of the equation by one in the form of $2^{10}/2^{10}$, the dequantization formula becomes: $\text{abs}[Yq(i,j)]=\{[\text{abs}(Y(i,j))+\text{offset}]\times 2^{10}\}/(qs\times 2^{10})=\{[\text{abs}(Y(i,j))+\text{offset}]\times 1024\}/(qs\times 1024)$. By multiplying both numerator and denominator of the right-hand side of the equation by such a large number (a bit-wise shift), less powerful computing machines may be able to perform the quantization and dequantization functions.

Figure 5:
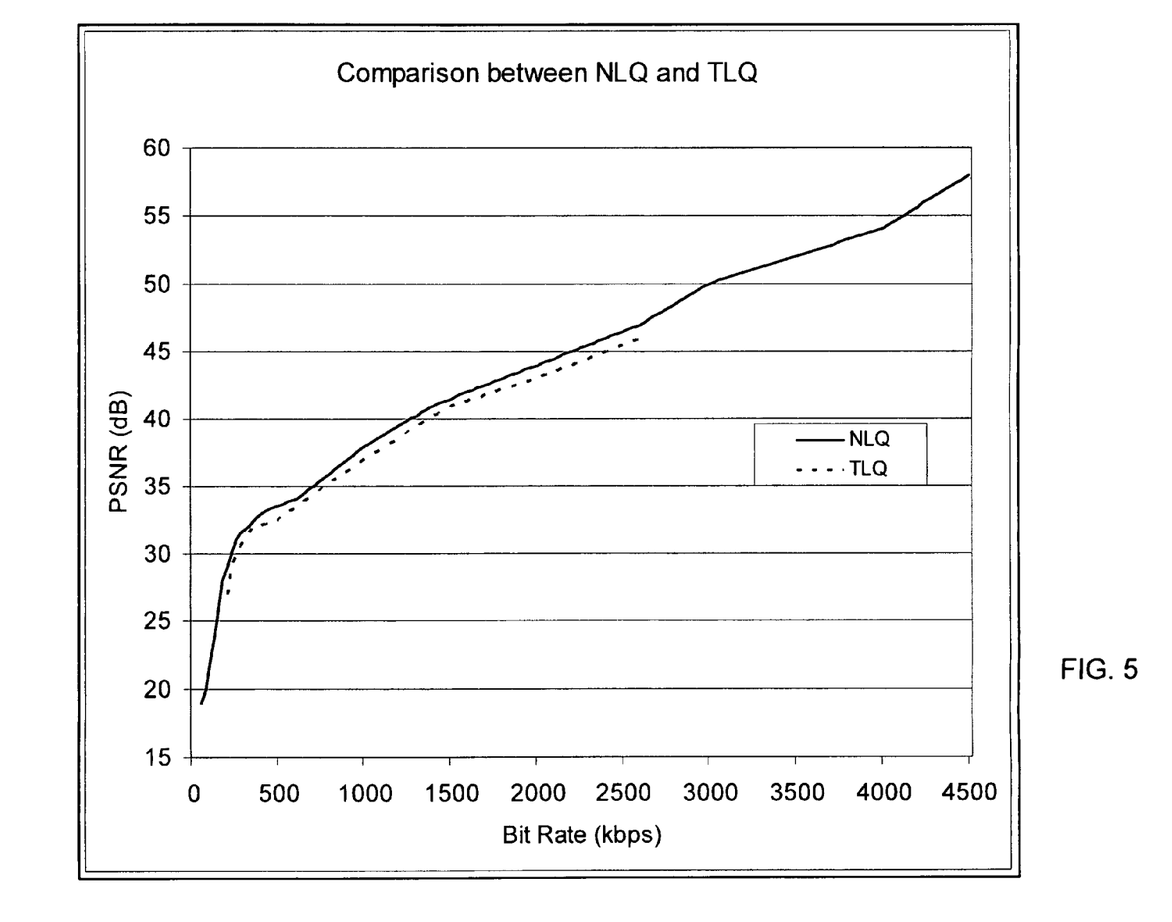
FIGS. 5-6 show graphs in accordance with one or more embodiments of the invention.

FIG. 5 shows an example in accordance with one or more embodiments of the invention. More specifically, FIG. 5 shows a graphical depiction of the difference in performance between compression and decompression of data using linear quantization and dequantization as described in the present invention and linear quantization and dequantization used in traditional methods.

In the graph in FIG. 5, NLQ is used to denote compression using one or more embodiments of the invention described above, and TLQ stands for traditional linear quantization. The vertical axis shows the peak signal-to-noise ratio (PSNR) in terms of decibels (dB), and the horizontal axis shows the bit rate (i.e., bandwidth) in terms of kilobits per second (kbps). The PSNR is an indication of the quality of the data after it has been compressed and subsequently decompressed. The higher the PSNR, the better the quality of the decompressed data. A common range of PSNR for decompressed data may be 34 dB to 40 dB.

As shown by the graph in FIG. 5, the solid line representing NLQ is located above the dashed line representing TLQ. The location of NLQ relative to TLQ shows that the quality of the data sent using NLQ is better for a given bandwidth than the quality of the data using TLQ. For example, if the bandwidth to transmit the compressed data is 2000 kbps, the PSNR using TLQ is 43 dB, and the PSNR using NLQ is 44 dB.

Figure 6:
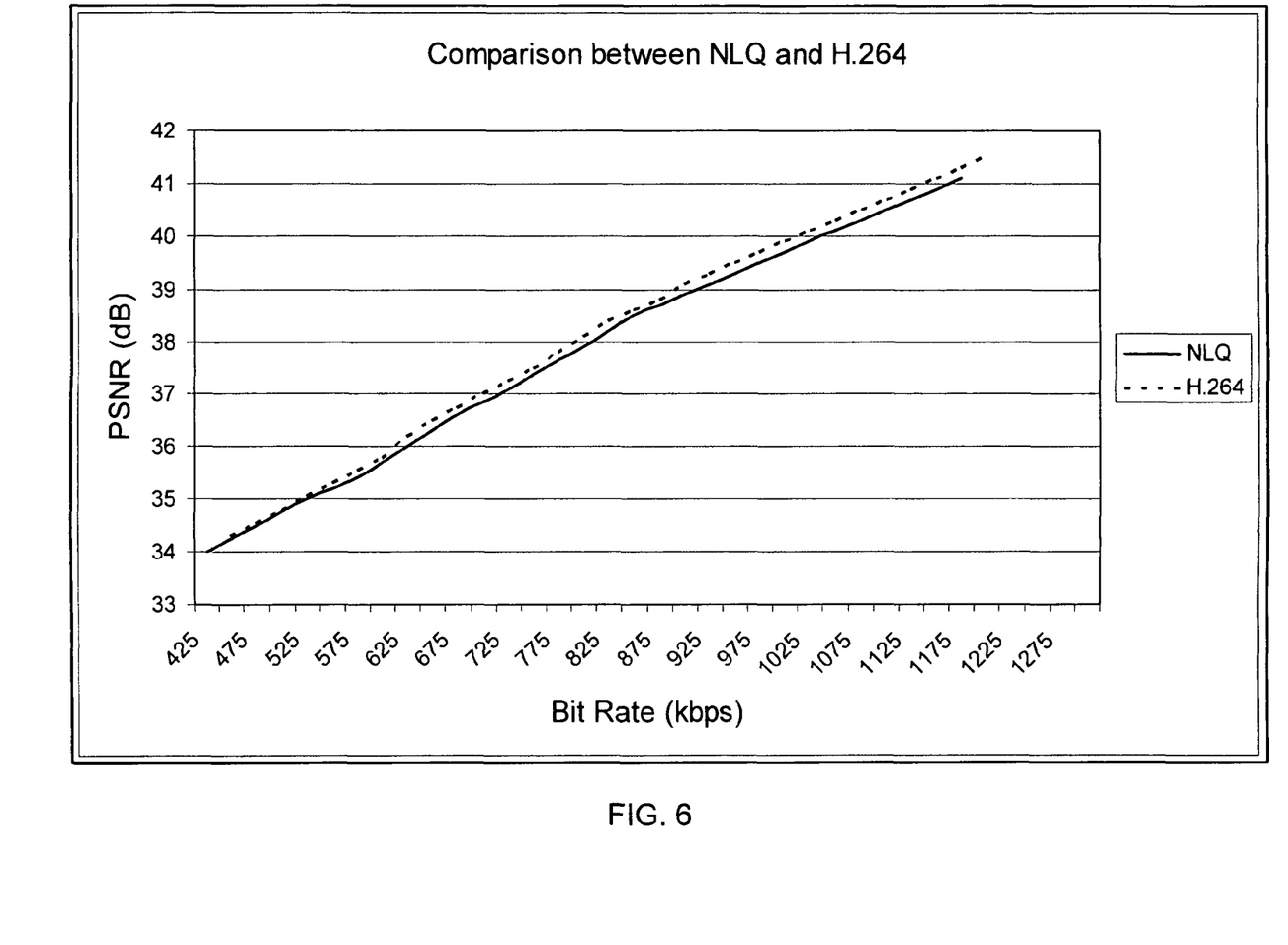

FIG. 6 shows an example in accordance with one or more embodiments of the invention. More specifically, FIG. 6 shows a graphical depiction of the difference in performance between compression and decompression of data using linear quantization and dequantization as described in one or more embodiments of the present invention (denoted by NLQ) and linear quantization and dequantization used in H.264.

As with FIG. 5, the vertical axis shows the PSNR in terms of decibles (dB), and the horizontal axis shows the bit rate (i.e., bandwidth) in terms of kilobits per second (kbps). As shown by the graph in FIG. 6, the solid line representing NLQ is located in alignment with or slightly below the dashed line representing H.264. The location of NLQ relative to H.264 shows that the quality of the data sent using NLQ is roughly the same, or only slightly less, for a given bandwidth than the quality of the data using H.264. For example, if the bandwidth to transmit the compressed data is 475 kbps, the PSNR using either H.264 or NLQ is 34.5 dB. As another example, if the bandwidth to transmit the compressed data is 1000 kbps, the PSNR using H.264 is 39.9 dB, and the PSNR using NLQ is 39.7 dB.

In addition, the range of bandwidth and PSNR in which NLQ operates in FIG. 6 is roughly the same as the range of bandwidth and PSNR in which H.264 operates. Also, the shape of the curve representing the NLQ data in FIG. 6 is substantially the same as the shape of the curve representing the H.264 data, indicates that the NLQ produces video quality that is similar to H.264.

Figure 7:
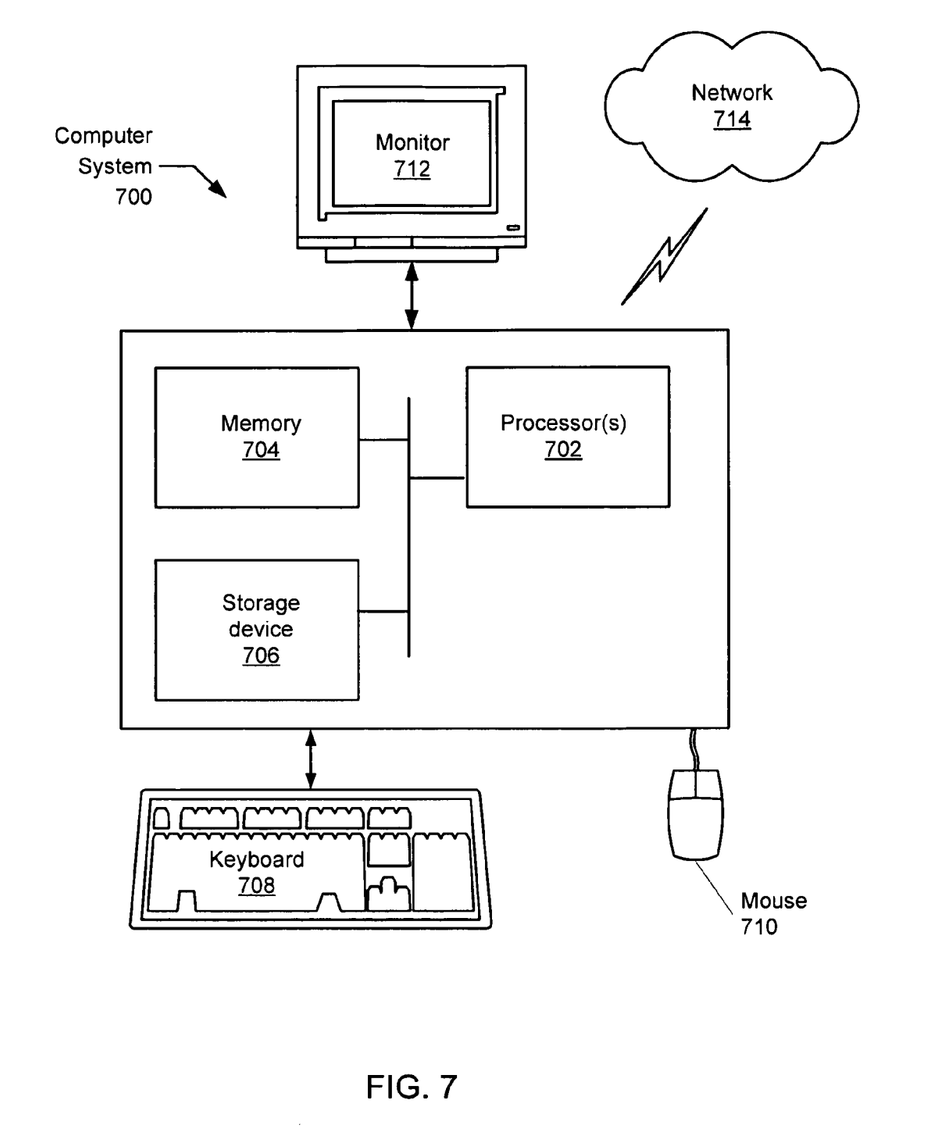
FIG. 7 shows a computer system in accordance with one or more embodiments of the invention.

Embodiments of the invention may be implemented on virtually any type of computer regardless of the platform being used. For example, as shown in FIG. 7, a computer system (700) includes one or more processor(s) (702), associated memory (704) (e.g., random access memory (RAM), cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computers (not shown). The computer (700) may also include input means, such as a keyboard (708), a mouse (710), or a microphone (not shown). Further, the computer (700) may include output means, such as a monitor (712) (e.g., a liquid crystal display (LCD), a plasma display, or cathode ray tube (CRT) monitor). The computer system (700) may be connected to a network (714) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms, now known or later developed. Generally speaking, the computer system (700) includes at least the minimal processing, input, and/or output means necessary to practice embodiments of the invention.

Further, those skilled in the art will appreciate that one or more elements of the aforementioned computer system (700) may be located at a remote location and connected to the other elements over a network. Further, embodiments of the invention may be implemented on a distributed system having a plurality of nodes, where each portion of the invention (e.g., data compression module, data decompression module) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer readable medium comprising instructions executable by a processor to perform a method, the method comprising:

receiving a set of input data in a first matrix format;

compressing the set of input data to obtain a first set of compressed data in a second matrix format, wherein compressing the set of input data comprises using a quantization equation, the quantization equation comprising:

$Yq(i,j)=[(Y(i,j)+\text{offset})<<n]/qs$, wherein

Yq(i,j) represents a coefficient in a matrix of the first set of compressed data having a coordinate (i,j);

Y(i,j) represents a coefficient in a matrix of the set of input data having the coordinate (i,j);

offset is an integer;

<< is a first bit-wise shift operator;

n is an integer; and qs is a real number; and sending the first set of compressed data to a first destination.

2. The computer readable medium of claim 1, the method further comprising:

receiving a second set of compressed data in the second matrix format;

decompressing the second set of compressed data to obtain a set of decompressed data, wherein decompressing the second set of compressed data comprises using a dequantization equation, the dequantization equation comprising:

$Ydq(i,j)=(Yq(i,j)\times qs)>>n$, wherein

Ydq(i,j) represents a coefficient in a matrix of the set of decompressed data having a coordinate (i,j); and >> is a second bit-wise shift operator; and sending the set of decompressed data to a second destination.

3. The computer readable medium of claim 2, wherein an inverse discrete cosine transformation is applied to each coefficient in the matrix of the set of decompressed data prior to sending the set of decompressed data.

4. The computer readable medium of claim 1, wherein the set of input data is associated with at least one of a group consisting of video and a data stream.

5. The computer readable medium of claim 1, wherein a discrete cosine transformation is applied to the set of input data prior to receiving the set of input data.

6. The computer readable medium of claim 1, wherein n determines the magnitude of the first bit-wise shift operator.

7. The computer readable medium of claim 6, wherein n is 10.

8. The computer readable medium of claim 1, wherein qs is a first configuration parameter.

9. The computer readable medium of claim 1, wherein the offset is determined using experimental data.

10. The computer readable medium of claim 1, wherein the offset is an adjustment used to reduce the loss of input data when compressing the first set of input data.

11. The computer readable medium of claim 1, wherein the offset is determined by the formula:

$\text{Offset}=1+(\text{quantOffset}[OMSQP\%m])>>(n-OMSQP)$, wherein quantOffset is an array of a quantization operation;

OMSQP%m is a remainder of a quotient of OMSQP and m, wherein m is an integer and OMSQP is an integer; and >> is a third bit-wise shift operator.

12. The computer readable medium of claim 11, wherein OMSQP is a second configuration parameter.

13. The computer readable medium of claim 12, wherein OMSQP is greater than 9.

14. The computer readable medium of claim 13, wherein OMSQP is less than 57.

15. The computer readable medium of claim 11, wherein m is the number of members within the quantOffset array.

16. A data compression module comprising:

a processor;

a memory comprising software instructions which, when executed by the processor, enable the data compression module to compress input data in a first matrix format to obtain compressed data in a second matrix format, wherein compressing the input data comprises using a quantization equation, the quantization equation comprising:

$Yq(i,j)=[(Y(i,j)+\text{offset})<<n]/qs$, wherein

Yq(i,j) represents a coefficient in a matrix of the compressed data having a coordinate (i,j);

Y(i,j) represents a coefficient in a matrix of the input data having the coordinate (i,j);

offset is an integer;

<< is a first bit-wise shift operator;

n is an integer; and qs is a real number; and a data interface configured to:

receive the input data in the first matrix format from a video source; and send the compressed data in the second matrix format to a destination.

17. The data compression module of claim 16, wherein the processor is further configured to apply a discrete cosine transformation to each coefficient in the matrix of the input data before compressing the input data.

18. The data compression module of claim 16, wherein the offset is determined by the formula:

$\text{Offset}=1+(\text{quantOffset}[OMSQP\%m])>>(n-OMSQP)$, wherein quantOffset is an offset of a quantization operation;
OMSQP%m is a remainder of a quotient of OMSQP and m, wherein m is an integer and OMSQP is an integer; and >> is a third bit-wise shift operator.

19. A data decompression module comprising:
a processor;
a memory comprising software instructions which, when executed by the processor, enable the data decompression module to decompress compressed data in a first matrix format to obtain decompressed data in a second matrix format, wherein decompressing the compressed data comprises using a dequantization equation, the dequantization equation comprising:

$Ydq(i,j) = (Yq(i,j) \times qs) >> n$, wherein $Ydq(i,j)$ represents a coefficient in a matrix of the decompressed data having a coordinate (i,j);
$Yq(i,j)$ represents a coefficient in a matrix of the compressed data having a coordinate (i,j);
qs is a real number;
n is an integer; and
>> is a second bit-wise shift operator; and a data interface configured to:
receive the compressed data in the first matrix format from a network; and
send the decompressed data in the second matrix format to a destination.

20. The data decompression module of claim 19, wherein an inverse discrete cosine transformation is applied to each coefficient in the matrix of the decompressed data after decompressing the compressed data.

* * * * *